Patented May 15, 1945

2,376,312

UNITED STATES PATENT OFFICE 2,376,312

CONSTANT VISCOSITY GREASES

John D. Morgan, South Orange, N. J., assignor to Cities Service Oil Company, New York, N. Y., a corporation of Pennsylvania No Drawing. Application April 15, 1942,
Serial No. 439,087

10 Claims. (Cl. 252—36)

This invention relates to grease lubricants and more particularly to greases adapted for operation at low temperatures.

Grease is being used in ever increasing quantities for lubricating bearings and other moving machine parts. One of the main reasons for this expanding use is the fact that grease is in paste form or semi-solid and can be easily applied to and maintained in contact with the moving parts to be lubricated. It is quite difficult to maintain a liquid oil in many types of bearings.

The lubrication of bearings on aeroplanes has presented a difficult problem because the bearing temperatures or the atmosphere in which the bearing is placed may vary in temperature from 215° F. to minus 60° F. Practically all petroleum greases become very thick and hard at low temperatures such as minus 40° F. and in fact set up such a great resistance to the movement of the bearings that they actually freeze or lock the bearings and prevent movement. On the other hand most petroleum greases become fluid at 200° F. so that they "drop" or flow and often run out of the bearings.

On account of the high cold tests of many paraffin petroleum distillates they have been excluded from use in making of greases that are to be used at low temperatures. The naphthenic base petroleum oils are extensively used for grease manufacture but the lubricating qualities of these oils are not as good as desired and furthermore these oils have a comparatively high cold test.

Vegetable and fish oils, such as castor and whale oils, are used in grease making and these oils have good lubricating qualities. Such oils, however, have comparatively high cold tests or freezing points and are not suitable for low temperature or for high temperature use.

I have discovered that some chemical compounds have a viscosity which is sufficiently high to act as a lubricant and this viscosity remains substantially constant over a wide range of temperatures. These chemical compounds may be modified and compounded with lubricating or film-forming constituents, anti-corrosion constituents, and anti-oxidants to make them non-corrosive and stable and thus adapt them for the manufacture of lubricating greases.

The primary object of the present invention is to provide a lubricating grease having a comparatively constant viscosity over a wide temperature range.

Another object of the invention is to provide a lubricating grease having a comparatively constant viscosity over a wide temperature range from minus 50° to 200° F. without the use of mixtures of hydrocarbons such as mineral oils.

A further object of the invention is to provide a lubricating grease having a comparatively constant viscosity over a wide temperature range which has good lubricating qualities and is non-corrosive and stable against oxidation and deterioration.

With these and other objects in view the invention consists in the improved grease hereinafter described and particularly defined in the claims.

In my co-pending application, Serial No. 433,020, filed March 2, 1942, I have described a lubricating oil manufactured from alkyl phosphates, such as tributyl and triethyl phosphates, that has a substantially constant viscosity over a wide temperature range, for example, minus 40° to 200° F.

In my co-pending application Serial No. 427,724, filed January 22, 1942, I have described a constant viscosity grease made up of a mineral lubricating oil with a lithium soap base.

In my invention described in application Serial No. 433,020 the product which has the lubricating qualities and the substantially constant viscosity is the alkyl phosphate, such as tributyl phosphate. In the grease described in application Serial No. 427,724 the compound which contributes most to the constant viscosity grease is the lithium stearate. The tests which have been made on these two compounds, however, show that the viscosity of the lubricating oil and grease is only relatively constant because the viscosity rises quite rapidly at temperatures below freezing. I have found that the alkyl phosphates may be blended with a lithium base soap to provide a grease which has a very low pour point and a very high "drop" or melting point.

One product which can be made in accordance with the present invention has the following formula:

Per cent by volume

1st:

| | |
|---|---|
| Tributyl phosphate | 72.5 |
| Polymerized castor oil | 20.0 |
| Lithium stearate | 5.0 |
| Aluminum stearate | 0.5 |
| Latex | 1.0 |
| Santolube No. 261 | 1.0 |

A second grease which shows excellent viscosity properties and good lubricating properties has the following formula:

Per cent by volume

2nd:

| | |
|---|---|
| Tributyl phosphate | 90 |
| Polane | 0.9 |
| Lead oleate | 0.9 |
| Santolube No. 261 | 0.2 |
| Lithium stearate | 6.5 |
| Aluminum stearate | 0.5 |
| Latex | 1.0 |

In making up the first formula a gel is formed by mixing the polymerized castor oil, lithium stearate, aluminum stearate, latex and Santolube. The Santolube acts as a detergent and antioxidant and is soluble in the castor oil. The mixing of these constituents is carried out under heat and the final temperature of the gelatinous mass is brought to about 420° F. After a uniform gel solution has been formed the tributyl phosphate is heated to about 200° F. and added to the soap gel with thorough stirring in order to form the final grease. This product is non-corrosive and does not readily deteriorate or oxidize. Furthermore the oil does not separate from the grease.

The polymerized castor oil is a castor oil which has had a heat treatment under a comparatively high pressure to cause it to become more soluble or to blend with the stearate soap. The heat treatment is generally carried to a temperature of about 570° F. in an inert atmosphere of carbon dioxide. This heat treatment destroys materials in the oil which tend to become rancid by oxidation. The polymerized castor oil has excellent extreme pressure lubricating properties and good film forming qualities.

The latex is added to provide a fiber to the grease and cause the grease to adhere to the metal bearing in which the grease is placed. Santolube No. 261 is an additive commonly used in modifying lubricating oils which is manufactured by the Monsanto Chemical Company of St. Louis, Missouri. This product is described as a metallic derivative of an alkylated carboxylic acid containing compounds of tin and sulfur. Methods for making this alkylated carboxylic acid tin salt are illustrated and described in Patents Nos. 2,197,834, granted April 23, 1940; 2,197,835, granted April 23, 1940; 2,256,441, granted September 16, 1941; and 2,257,751, granted October 7, 1941. The percentage of tin in the additive agent is 3.25% by weight and the percentage of sulfur in the additive is .8% by weight. Santolube No. 261 may be defined as a sulfurized tin salt of an alkyl phenol carboxylic acid. This product acts as a pour point depressant and an antioxidant and also acts as an inhibitor for preventing the corrosion of the metals with which the lubricant comes into contact. In place of Santolube a tin-chrome soap (stearate, oleate, etc.) can be used.

The tributyl phosphate has a comparatively high viscosity for a liquid and displays oiliness characteristics. In place of the tributyl phosphate may be used dibutyl phosphate or triamyl phosphate. The triamyl phosphate has many excellent characteristics and has a higher viscosity than tributyl phosphate. Triethyl phosphate on the other hand has a lower viscosity than triamyl phosphate.

The lithium stearate is made by the saponification of stearic acid with lithium carbonate. This product has very remarkably constant viscosity as a soap throughout a wide temperature range. It has been found that 2% of lithium stearate may be blended with the alkyl phosphate to form a good lubricant. On the other hand it has been found that 12% of lithium stearate may be blended with the alkyl phosphates to make a suitable grease which has a substantially constant viscosity characteristic. From 2% to 15% of lithium stearate may be advantageously used in the manufacture of the grease to obtain the desired characteristics. The tendency has been to use a minimum amount of lithium stearate on account of the high cost of the lithium salts.

Aluminum stearate is used in the grease in a small quantity because this stearate tends to stablize the soap and form a homogeneous clear gel that blends well with the alkyl phosphates.

In making up the second formula soap is made of the lithium stearate, aluminum stearate and latex when heating these products at a temperature of about 420° F. A constant viscosity lubricating oil made up of tributyl phosphate, Polane, lead oleate and Santolube No. 261 is prepared and heated and then blended into the soap with constant and active stirring. The tributyl phosphate, Santolube, lithium stearate, aluminum stearate, and latex act in the second formula in the same manner that these same constituents act in the first formula as described above. Polane is a commercial product on the market sold by Patent Chemicals Company which is an ester of a fatty acid or a chlorinated ester of a fatty acid, such as ethyl laureate, or chloromethyl stearate. These products are described as addition agents for a gasoline motor fuel in the patent to Orelup 1,692,784, granted November 20, 1928. These products impart oiliness and film forming properties to the butyl phosphate and blend uniformly with the phosphate. Other E. P. agents may be employed.

In place of lead oleate, lead naphthenate or other lead compounds of fatty or organic acids, may be used. The lead compounds act to make the tributyl phosphate and soap compounds non-corrosive to various kinds of bearing metals.

In Formulas 1 and 2 referred to above, lithium stearate is used as the soap base. This soap tends to provide a grease with a very low cold test. If the grease does not need to have a low cold test then other soaps may be substituted for the lithium stearate. For example calcium, strontium, barium, potassium and sodium stearates may be used. Furthermore the oleates and other fatty acid soaps may be used. The characteristics of the calcium, sodium and potassium base greases are well known. The soaps of these metals have somewhat the same properties when used with the constant viscosity fluid such as trialkyl phosphates to make grease having a much more uniform viscosity at different temperatures than if petroleum oils are dissolved in these soaps.

The polymerized castor oil, the Santolube No. 261, the lead oleate or naphthenate, as well as the latex are all soluble in the tributyl phosphate so that these products blend with the soap very readily to form a stable grease.

While emphasis has been placed on the viscosity of this type of grease at the very low temperatures, it is equally important that the grease should not "drop" or break at the higher temperatures. Greases made in accordance with Formulas 1 and 2 have a comparatively high dropping point temperature and have a good semi-liquid or paste consistency at temperatures as low as minus 50° F. The penetration characteristics of these greases are as follows:

For the first formula employing polymerized castor oil the penetration at minus 35° F. is 212 and the penetration at +5° F. is 302. With the grease made in accordance with the second formula, wherein no castor oil is employed, the penetration at minus 35° F. was 106 and the penetration at +5° F. is 183.

The preferred form of the invention having been thus described, what is claimed as new is:

1. A comparatively constant viscosity lubricating grease comprising, a major portion of a polyalkyl phosphate in which the alkyl group has five carbon atoms per molecule or less and a minor portion of polymerized castor oil dissolved therein, and a lithium fatty acid soap blended therewith to form a grease.

2. A comparatively constant viscosity lubricating grease comprising a major portion of a polyalkyl phosphate, in which the alkyl group has five carbon atoms per molecule or less, a minor portion of a polymerized castor oil and latex dissolved therein, and a lithium fatty acid soap blended with the phosphate, the polymerized castor oil and latex to form a grease of uniform consistency.

3. A comparatively constant viscosity lubricating grease comprising, a major portion of tributyl phosphate, and a minor portion of polymerized castor oil, and lithium fatty acid soap.

4. A comparatively constant viscosity lubricating grease comprising, tributyl phosphate 70 to 75%, polymerized castor oil 20%, a mixture of lithium and aluminum stearates 5 to 10%.

5. A comparatively constant viscosity lubricating grease comprising, tributyl phosphate 72.5%, polymerized castor oil 20%, lithium stearate 5%, aluminum stearate 0.5%, latex, 1%, sulfurized tin salt of an alkyl phenol carboxylic acid 1%.

6. A comparatively constant viscosity lubricating grease comprising, tributyl phosphate 90%, chorinated ester of a higher fatty acid 0.9%, lead oleate 0.9%, a sulfurized tin salt of an alkyl phenol carboxylic acid 0.2%, lithium stearate 6.5%, aluminum stearate 0.5%, and latex 1%.

7. A comparatively constant viscosity lubricating grease comprising, 92% tributyl phosphate containing a small proportion of film forming non-corrosive and antioxidant agents dissolved therein, and blended with 6.5% of lithium stearate, 0.5% aluminum stearate, and 1% latex.

8. A comparatively constant viscosity lubricatting grease comprising 85 to 95% of trialkyl phosphate in which the alkyl group has five or less carbon atoms to the molecule stabilized against rust and oxidation, and blended with 15 to 5% of metallic fatty acid soap composed of 5 to 10% of aluminum stearate, and 95 to 90% of lithium stearate.

9. The grease defined in claim 8 in which the metallic fatty acid soap is composed of 5 to 10% of aluminum fatty acid soap, and 95 to 90% of a metal fatty acid soap in which the metal is one of the group consisting of calcium, strontium, barium, potassium and sodium.

10. A comparatively constant viscosity lubricating grease comprising, 65 to 75% of trialkyl phosphate in which the alkyl group has five or less carbon atoms per molecule, 20 to 15% of polymerized castor oil, 15 to 10% of a lithium fatty acid soap, said phosphate having dissolved therein about 1% of an antioxidant and corrosion inhibitor.

JOHN D. MORGAN.